United States Patent Office 2,718,232
Patented Sept. 20, 1955

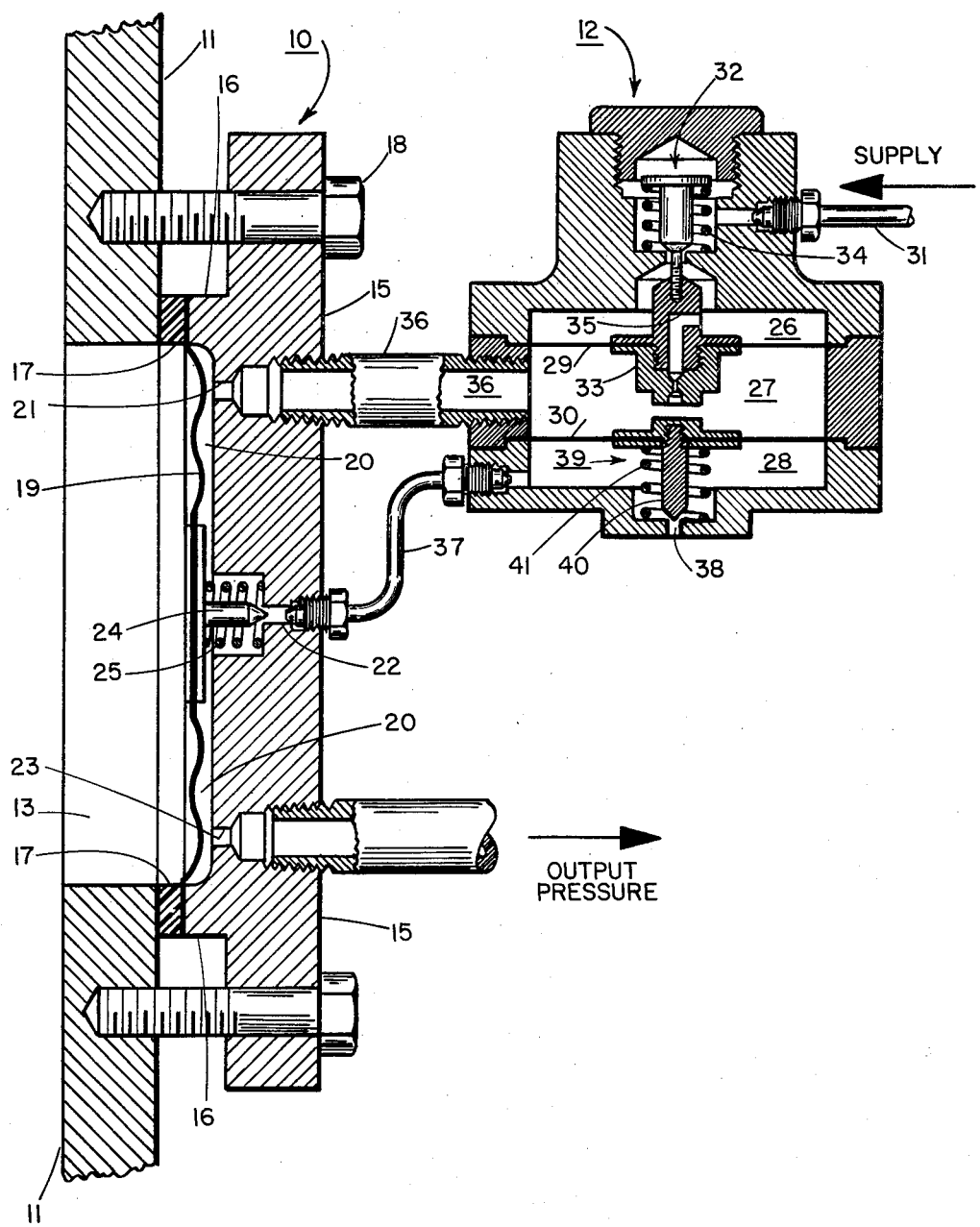
FIG. I

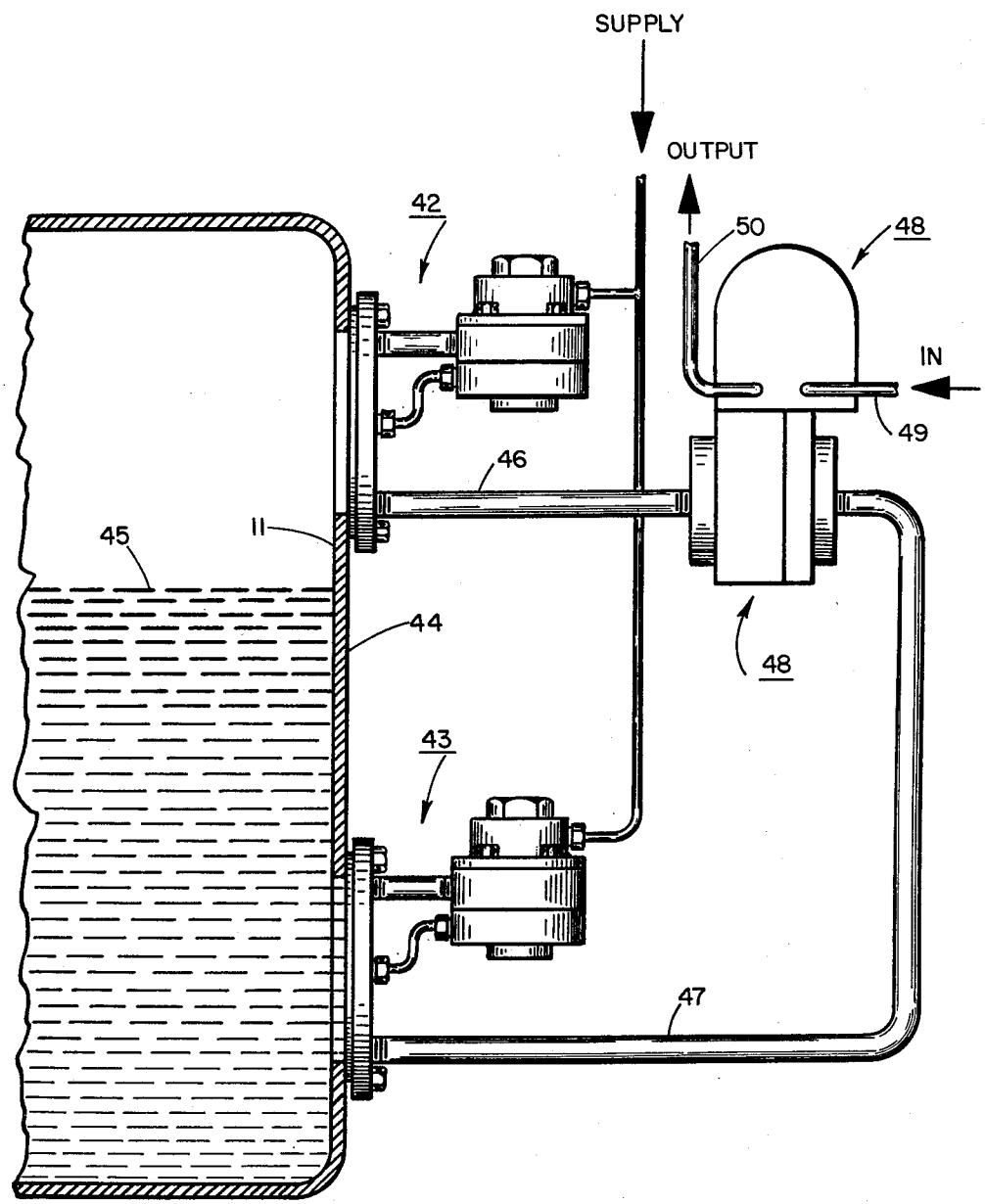
FIG. II
INVENTOR.
LYMAN COOK
WILFRED H. HOWE

2,718,232

PRESSURE TRANSMISSION BALANCED FLUID SYSTEM

Lyman Cook, Foxboro, and Wilfred H. Howe, Sharon, Mass., assignors to The Foxboro Company, Foxboro, Mass., a corporation of Massachusetts Application August 12, 1954, Serial No. 449,472

4 Claims. (Cl. 137—85)

This invention relates to pneumatic transmission systems, and more particularly to pneumatic transmission systems of the supply and bleed type.

Such systems have been used, for example, to transmit pressure values of a fluid body in a tank. This is accomplished by providing an aperture in the tank wall and using a diaphragm as a closure for this aperture. Further, a pneumatic system is used which is operable in response to movement of such a diaphragm, as produced by pressure changes in the tank.

These prior art systems provide the conventional one-to-one air supply and bleed diaphragm pneumatic transmitters. In these transmitters there is a constant pressure air supply feeding through a fixed inlet restriction to the chamber behind the diaphragm. Motion of the diaphragm operates a relief valve to bleed air from this diaphragm chamber when the pressure behind the diaphragm exceeds the pressure on the tank side of the diaphragm. This conventional system provides an air pressure output from the diaphragm chamber roughly equal to the tank pressure applied to the diaphragm. However, as the measured pressure in the tank varies, the pressure difference varies across both the inlet restrictor and the relief valve. As a result, the flow of air into the chamber behind the diaphragm, the position of the relief valve, and hence the position of the diaphragm, all change with variation of the measured pressure. In addition, the variation of differential pressure across the relief valve area introduces an additional force which varies with the measured pressure. Consequently the air pressure behind the diaphragm differs from the measured pressure in the tank by an amount which varies with the measured pressure. Where accurate duplication of tank pressure is desired, the above errors become important if the pressure being measured varies appreciably.

This invention provides means for overcoming the above errors. In this invention, the main diaphragm is held to the same position of balance throughout the operating range of the device. The diaphragm is so held because the pneumatic supply absolute mass in-flow is established and maintained equal to the absolute mass exhaust flow, throughout the operating range of the device. This flow relation is so established and maintained because predetermined pressure drops in the supply and exhaust systems are established and maintained throughout the operating range of the device. Thus the overall system is provided with a constant total absolute mass pneumatic flow throughout the operating range of the device.

In the conventional transmitter, the supply pressure is held constant, and the exhaust is to atmosphere, which is effectively at a constant pressure. Therefore, when the measured pressure changes and the opposing pressure in back of the diaphragm consequently changes, this new diaphragm chamber pressure is related to the constant supply and exhaust pressures. The result is the previously mentioned differences in supply and exhaust pressure drops with the consequent errors in measurement of the tank pressure. In the transmitter of this invention however, the diaphragm chamber pressure, throughout the range of the device, is related to changing supply pressures and exhaust ambiency pressures in such a manner that the supply and exhaust pressure drops are maintained in a fixed predetermined relation with each other.

Therefore, this invention provides a device wherein the output pressure is always exactly equal to the measured pressure, throughout the operating range of the device. As a specific application, this invention is useful in measuring the pressures of corrosive liquids. A suitable diaphragm or diaphragm assembly is used, wherein a resilient body has one side faced with corrosion resistant material. This may be a unitary structure, a lamination, or simply a juxtaposition of two bodies. A tantalum diaphragm and a teflon gasket are arranged in this case as the only portions of the transmitter unit which are exposed to the measured liquid. In this particular arrangement, the inherently poor resilience characteristics of the tantalum diaphragm require that suitable supporting structure be used with this diaphragm, for example, a supporting, more resilient diaphragm. Other corrosion resistant diaphragm assemblies may be used, for example, a bimetal sealed assembly of two diaphragms, one of which is corrosion resistant and the other which is resilient.

It is, accordingly, an object of this invention, to provide improved pressure transmitting apparatus.

It is a further object of this invention to provide pressure transmitting apparatus of the character described, wherein the output pressure is maintained exactly equal to the measured pressure, throughout the operating range of the device.

Other objects and advantages of this invention will be in part apparent and in part pointed out hereinafter.

In the drawings:

Figure I is a vertical central section through a pressure transmitter embodying this invention, as attached to a tank wall and overlying a tank wall opening for measurement of the pressure within the tank at the wall opening; and Figure II is a showing of a pair of pressure transmitters embodying this invention, in association with a fluid containing tank and with a differential pressure device arranged to measure the pressure difference between the output pressures of the two pressure transmitters, as application of an embodiment of this invention to the measurement of fluid level in a tank.

Referring to Figure I, the illustrative embodiment of this invention shown therein comprises a supply and bleed diaphragm transmitter 10 secured to a fluid tank wall 11, and a supply and exhaust regulator unit 12, mounted on and operatively connected to the transmitter 10.

The tank wall 11 is provided with a circular aperture 13 therethrough, as a means of applying the pressure of fluid (not shown) in the tank to the transmitter 10. The supply and bleed transmitter 10 has a circular main body 15 with an annular boss 16 around the tank wall aperture 13. A resilient sealing ring 17 is matched to the annular boss 16 and is mounted as a fluid seal, between the tank wall 11 and the boss 16, with the inner diameter of the sealing ring 17 and the inner diameter of the annular boss 16 flush with the circular aperture 13 of the tank wall 11. The transmitter main body 15 extends radially outward along the tank wall and spaced therefrom, well beyond the aperture 13. Suitable bolts 18 are extended through these spaced portions of the transmitter main body 15 and are threaded into the tank wall 11. A circular diaphragm 19 is held along its peripheral edge between the sealing ring 17 and the transmitter body annular boss 16, as a closure for the tank wall aperture 13.

The transmitter main body 15 is provided with a main chamber 20, behind the diaphragm 19. The chamber 20 has an air pressure supply inlet 21, an exhaust valve including an exhaust port 22, and an output port 23. The exhaust port 22 has an enlarged portion opening on the main chamber 20, for receiving an exhaust valve stem 24 and an exhaust valve bias coil spring 25. The valve stem 24 has one end secured to the center of the diaphragm 19 and its other end tapered for seating in the smaller portion of the exhaust port 22. The bias coil spring 25 surrounds the valve stem 24, is bottomed in the enlarged portion of the exhaust port 22, and bears on the diaphragm 19. Although the spring 25 resists the closing of the exhaust valve port 22, it exerts no effective pressure on the diaphragm 19 when the diaphragm is in its normal, balanced position, i. e., with the applied pressure in the tank and the pressure in the main chamber 20 exactly equal.

The supply and exhaust regulator unit 12 is designed, as will be detailed hereinafter, to hold constant a pressure drop in the supply system to the transmitter, and another pressure drop in the exhaust system of the transmitter. In effect, this regulator unit is a double differential pressure reducing valve.

The regulator unit 12 is a generally cylindrical body having three chambers therein; a supply chamber 26, a central chamber 27, and an exhaust chamber 28. The dividing wall between the supply and central chambers is a flexible supply diaphragm 29, and the dividing wall between the central and exhaust chambers is a flexible, exhaust diaphagm 30.

The supply chamber 26 is provided with air pressure from an air supply inlet pipe 31, through a supply regulator valve 32. A supply valve connection body 33 is secured to the central portion of the supply diaphragm 29 and the stem of the supply regulator valve 32 is secured to the connection body 33. A supply valve bias spring 34 tends to hold the supply regulator valve open, and whatever pressure is in the supply chamber 26 tends to close the supply regulator valve 32 by pushing down on the supply diaphragm 29.

From the supply chamber 26, air flow is provided to the central chamber 27 through the supply diaphragm 29 by way of a fixed restrictor passage 35 in the connection member 33. The air supply system is then completed from the central chamber 27 to the transmitter supply inlet 21, through a supply pipe 36.

The exhaust chamber 28 is sealed off from the central chamber 27 by the exhaust diaphragm 30, and an exhaust connection pipe 37 connects the transmitter exhaust port 22 with the exhaust chamber 28. The size of the exhaust connection pipe 37 is not critical, but simply a matter of convenience.

A further point in the formation of the exhaust chamber 28 is an outlet port 38 to atmosphere. Also an exhaust regulator valve 39 is provided for opening and closing the exhaust outlet port 38. The exhaust regulator valve consists of a stem 40, secured to the central portion of the exhaust diaphragm 30, and a bias spring 41, which opposes the closing of the outlet port 38 by movement of the exhaust diaphragm 30.

The transmitter output port 23 carries the output pressure fluid of the whole transmitter, ordinarily to a dead-end pneumatic system (not shown) as a working force for indicating, recording, or controlling, or combinations thereof.

*Operation*

Throughout the operating range of this device, i. e., throughout the operating range of fluid pressures in the tank to be transmitted by this device, the main diaphragm 19 is operated to balance at the same position. This means that the exhaust port 22 is always open the same amount. Also, in the supply system, the fixed restrictor passage 35 is, of course, always open the same amount. Given a constant pressure drop across the supply restrictor 35 and a constant pressure drop across the exhaust port 22, the system is provided with an in-flow and an out-flow which are equal in absolute mass flow with respect to each other throughout the operating range of the device.

The constant pressure drop across the supply restrictor 35 is provided as follows: An input pressure fluid is provided through the pipe 31 at substantially more, perhaps ten pounds more, than the maximum pressure expected from the test tank through the tank wall 11. The supply regulator valve 32 is arranged so that in order to close the valve 32, the pressure in the supply chamber 26 must be a fixed amount, for example, four pounds, more than the pressure in the central chamber 27. Since the main diaphragm (19) balancing pressure is always equal to the pressure in the central chamber 27, there is always a flow through the fixed restrictor 35, and the pressure drop across the fixed restrictor 35 is always the same, i. e., the pressure required to overcome the force of the spring in the supply regulator valve 32.

Similarly, the constant pressure drop across the transmitter exhaust valve arrangement is provided as follows: The exhaust regulator valve spring 41 provides a force which is in aid of the exhaust chamber (28) force as a means of opening the exhaust output port 38. Thus, in order to open the exhaust port 38, the pressure in the exhaust chamber 28 need only be a fixed amount, for example, four pounds, less than the pressure in the central chamber 27, that is, the main diaphragm (19) balancing pressure in the transmitter chamber 20. Accordingly, there is always a flow through the exhaust port 22, and there is always a fixed pressure drop across the exhaust valve arrangement which includes the port 22.

The supply and bleed condition of the whole system is such that for any balance condition of the system, all the valves, supply regulator, main diaphragm (19) and exhaust regulator, are open somewhat, and air is constantly flowing from supply to exhaust. Since the supply and exhaust conditions are always the same, that is, there are constant pressure drops in each, the balancing pressure in the main diaphragm chamber 20, in balance condition, is exactly the same as the measured tank pressure, throughout the operating range of the device.

Thus the supply regulator valve 32 reduces the supply pressure to a value three or four p. s. i. greater than the actual main diaphragm balancing pressure. This differential pressure is then applied to the fixed restrictor 35, thereby providing a constant air in-flow regardless of the actual main diaphragm balancing pressure. Similarly, the exhaust regulator valve restricts the out-flow to atmosphere, holding the pressure downstream of the exhaust port 22 at a value consistently three or four pounds less than the actual main diaphragm balancing pressure. This eliminates the error from varying differential pressure across the relief valve. Note that the supply and exhaust pressure drops need not be equal but their relation to each other is constant. With such relations holding throughout the operating range of the device, variations in the measured pressure do not affect the exactly equal relation between the measured pressure and the output pressure of the device. In the showing of Figure I all the valves are shown as slightly open, indicating a condition of pneumatic balance in the overall system.

Figure II illustrates an application of this invention in the form of a differential pressure system for liquid level measurements, using a pair of one-to-one pneumatic pressure transmitters 42 and 43. Each of these transmitters may be in duplication of the structure and arrangement of Figure I. In Figure II a tank 44 is shown, with a liquid body 45 therein. The tank wall 11 has an upper aperture 13 and a lower aperture 13" with the transmitters 42 and 43 respectively in overlying relation therewith. The transmitter output pipes 46 and 47 lead to opposing sides of a suitable differential pressure measuring unit 48, which is provided, as shown, with an air supply pipe 49 and an output pressure pipe 50 in the usual manner for such devices.

The air supply to both of the transmitter units 42 and 43 is supplied from a single source, through a supply pipe 51.

This invention, therefore, provides a new and improved pressure transmitter of the supply and bleed type, wherein the output pressure is exactly equal to the measured pressure throughout the operating range of the device, by reason of constant pressure drops in the supply and exhaust systems.

As many embodiments may be made of the above invention, and as changes may be made in the embodiments set forth above, without departing from the scope of the invention, it is to be understood that all matter hereinbefore set forth or shown in the accompanying drawings is to be interpreted as illustrative only and not in a limiting sense.

We claim:

1. In a device of the character described, a pressure chamber, a closure for said chamber with said closure in the form of a unit for producing movement in response to the application of pressure thereto, means for introducing pressure into said chamber and against said closure for balancing opposition to pressure to be transmitted, means for providing a predetermined pressure drop in said pressure introducing means and for maintaining said pressure drop throughout the operating range of said device, an exhaust system leading from said chamber, an exhaust valve arrangement for said system and operable by movement of said closure, means for providing a predetermined pressure drop in said exhaust system and for maintaining said exhaust system pressure drop throughout the operating range of said device, and means for making the pressure in said chamber available as an output working pressure of said device.

2. A pneumatic pressure transmitter comprising, in combination, a pressure chamber, a pressure responsive diaphragm mounted as a closure for said chamber, a pressure supply system for introducing pneumatic pressure into said chamber and against said closure for balancing opposition to pressure to be transmitted, a pressure regulator arrangement including a diaphragm operated valve and a fixed restriction, for providing a predetermined pressure drop in said pressure supply system and for maintaining said pressure drop throughout the operating range of said device, an exhaust system leading from said chamber and operable by movement of said closure, an exhaust regulator ararngement including a diaphragm operated valve for providing a predetermined pressure drop in said exhaust system and for maintaining said exhaust system pressure drop throughout the operating range of said device, and an output pressure passage from said chamber.

3. For use with a fluid pressure supply and bleed transmitter system, a unit for the control of the supply and exhaust of said transmitter system, said unit comprising, in combination, a group of chambers including a supply chamber, a central chamber, and an exhaust chamber, a pair of pressure movable members arranged as dividing walls between said chambers, a supply pressure regulator valve for controlling the pressure in said supply chamber, a mechanical operating connection from said pressure regulator valve to the pressure movable member between said supply and central chambers, a fixed restrictor passage from said supply chamber to said central chamber, a supply pressure connection pipe from said central chamber to said transmitter system, an exhaust connection from said exhaust chamber to said transmitter system, an exhaust pressure regulator valve for controlling the pressure in said exhaust chamber, and a mechanical operating connection from said exhaust pressure regulator valve to the pressure movable member between said exhaust and central chambers.

4. A pneumatic pressure transmitter system comprising, in combination, a main transmitter unit of the supply and bleed type, and a combined supply and exhaust unit associated with said main transmitter unit, said main transmitter unit comprising a main pressure chamber, a diaphragm closure for said main chamber, a pressure inlet to said main chamber, an exhaust outlet from said main chamber, an exhaust valve in said outlet, a mechanical operating connection between said exhaust valve and said diaphragm, and a pressure output passage from said main chamber, said supply and exhaust unit comprising a group of chambers including a supply chamber, a central chamber, and an exhaust chamber, a supply pressure regulator valve for controlling the pressure in said supply chamber, a supply diaphragm dividing said supply and central chambers, a mechanical operating connection from said supply diaphragm to said supply regulator valve, a fixed restrictor passage from said supply chamber to said central chamber, a supply pressure connection pipe from said central chamber to said transmitter main chamber inlet, an exhaust diaphragm dividing said central and exhaust chambers, an exhaust connection from said exhaust chamber to said transmitter main chamber exhaust outlet, an exhaust regulator valve for controlling the pressure in said exhaust chamber, and a mechanical operating connection from said exhaust regulator valve to said exhaust diaphragm.

References Cited in the file of this patent

UNITED STATES PATENTS

| | | |
|---|---|---|
| 2,265,114 | Hartley | Dec. 2, 1941 |
| 2,649,714 | Griffith, Jr. | Aug. 25, 1953 |